United States Patent
Van Weynbergh et al.

(10) Patent No.: US 8,420,702 B2
(45) Date of Patent: Apr. 16, 2013

(54) PROCESS FOR RECYCLING ARTICLES BASED ON A FIBER REINFORCED POLYMER

(75) Inventors: Jacques Van Weynbergh, Brussels (BE); Stephane Noel, Rixensart (BE)

(73) Assignee: Solvay S.A., Brussels (BE)

( * ) Notice: Subject to any disclaimer, the term of this patent is extended or adjusted under 35 U.S.C. 154(b) by 226 days.

(21) Appl. No.: 12/990,929

(22) PCT Filed: May 7, 2009

(86) PCT No.: PCT/EP2009/055508
§ 371 (c)(1),
(2), (4) Date: Nov. 3, 2010

(87) PCT Pub. No.: WO2009/135891
PCT Pub. Date: Nov. 12, 2009

(65) Prior Publication Data
US 2011/0065817 A1    Mar. 17, 2011

(30) Foreign Application Priority Data

May 9, 2008  (EP) .................................. 08155987

(51) Int. Cl.
C08J 11/04    (2006.01)
(52) U.S. Cl.
USPC ................ 521/46.5; 521/40; 521/45; 521/46; 528/480; 528/491; 528/493; 528/499; 528/500; 528/502 R
(58) Field of Classification Search .................... 521/40, 521/40.5, 41, 42, 42.5, 44, 44.5, 45, 45.5, 521/46, 46.5, 47, 48.5; 528/480, 481, 489, 528/491, 495, 499, 500, 501, 502 R, 502 A, 528/502 D, 502 E, 503
See application file for complete search history.

(56) References Cited

U.S. PATENT DOCUMENTS

| | | |
|---|---|---|
| 3,624,009 A | 11/1971 | Sussman et al. |
| 6,172,125 B1 | 1/2001 | Vandenhende et al. |
| 6,989,404 B2 | 1/2006 | Yamamoto et al. |
| 7,056,956 B2 | 6/2006 | Vandenhende et al. |
| 7,135,546 B1 | 11/2006 | Vandenhende et al. |
| 2005/0010027 A1 | 1/2005 | Vandenhende et al. |
| 2005/0077640 A1 | 4/2005 | Fassiau et al. |
| 2006/0173085 A1 | 8/2006 | Fassiau et al. |
| 2006/0173086 A1 | 8/2006 | Fassaiau et al. |
| 2006/0194913 A1 | 8/2006 | Pleska et al. |
| 2006/0223896 A1 | 10/2006 | Lepers et al. |
| 2008/0047671 A1 | 2/2008 | Vandenhende |
| 2009/0124715 A1 | 5/2009 | Vandenhende |
| 2009/0149619 A1 | 6/2009 | Fassiau et al. |
| 2010/0179292 A1 | 7/2010 | Fassiau et al. |
| 2010/0305223 A1 | 12/2010 | Lepers et al. |

FOREIGN PATENT DOCUMENTS

| | | |
|---|---|---|
| EP | 0945481 A1 | 9/1999 |
| FR | 2921372 A1 | 3/2009 |
| JP | 20070284530 A | 11/2007 |
| JP | 20070284531 A | 11/2007 |
| JP | 20080062186 A | 3/2008 |
| JP | 20080184510 A | 8/2008 |
| JP | 20090144031 A | 7/2009 |
| JP | 20090149766 A | 7/2009 |
| WO | WO 01/23463 A1 | 4/2001 |
| WO | WO 01/70865 A1 | 9/2001 |
| WO | WO 03/064504 A1 | 8/2003 |
| WO | WO 2004/081093 A1 | 9/2004 |
| WO | WO 2005/014705 A1 | 2/2005 |
| WO | WO 2005017010 A1 | 2/2005 |
| WO | WO 2005/100411 A1 | 10/2005 |
| WO | WO 2005/100461 A1 | 10/2005 |
| WO | WO 2006/030020 A1 | 3/2006 |
| WO | WO 2006/051116 A1 | 5/2006 |
| WO | WO 2006/053907 A1 | 5/2006 |
| WO | WO 2006/069856 A1 | 7/2006 |
| WO | WO 2007/020280 A1 | 2/2007 |
| WO | WO 2009037316 A1 | 3/2009 |

OTHER PUBLICATIONS

U.S. Appl. No. 10/564,700, filed Mar. 23, 2006, Fassiau, et al.
U.S. Appl. No. 11/719,825, filed Oct. 1, 2007, Fassiau, et al.
U.S. Appl. No. 11/719,255, filed Sep. 21, 2007, Vandenhende.
U.S. Appl. No. 12/063,710, filed Feb. 13, 2008, Fassiau, et al.
U.S. Appl. No. 12/677,906, filed Mar. 12, 2010, Lepers, et al.

*Primary Examiner* — Frances Tischler
(74) *Attorney, Agent, or Firm* — Oblon, Spivak, McClelland, Maier & Neustadt, L.L.P.

(57) ABSTRACT

Process for recycling a fiber reinforced polymer article, according to which the article, eventually cut in fragments, is dissolved in a solvent capable of dissolving the polymer but not the fibers and which is susceptible of forming an azeotrope with water, forming a solution; the fibers are recovered from the solution; the fibers are washed with solvent by putting them in the form of a slurry in the solvent and by agitating the slurry and/or by making the solvent circulate through it; the washed fibers are recovered from the slurry; and the recovered fibers are submitted to a stripping with steam in order to substantially remove the solvent.

15 Claims, No Drawings

PROCESS FOR RECYCLING ARTICLES BASED ON A FIBER REINFORCED POLYMER

CROSS-REFERENCE TO RELATED APPLICATIONS

The present patent application is a U.S. national stage application under 35 U.S.C. §371 of International Application No. PCT/EP2009/055508 filed May 7, 2009 which claims the benefit of the European patent application No. 08155987.4 filed on May 9, 2008, the whole content of this application being incorporated herein by reference for all purposes.

TECHNICAL FIELD OF THE INVENTION

The present invention relates to a process for the recycling of articles, and in particular of sheets, based on a fiber reinforced polymer (preferably a vinyl chloride polymer).

BACKGROUND OF THE INVENTION

Vinyl chloride polymers (PVC) are widely used for the manufacture of a variety of articles. They are used, for example, for the manufacture of sheets—generally reinforced with reinforcing fibers—intended for covering soils, for covering vehicles (trucks), for the concealing of buildings on which work is being carried out, for the construction of sets for entertainments or exhibitions, or for advertizing purposes. These sheets generally have a large surface area. Furthermore, in many applications, most particularly in advertising applications or in applications involving sets for entertainments or exhibitions, which at the present time are growing considerably, their lifetime is short, typically a few weeks or months. For these reasons, large quantities of such sheets are scrapped each year. The process of recycling them consequently constitutes a major ecological and economic problem.

The same situation applies with regard to other articles based on one or more, flexible or rigid, polymers (preferably PVC) for example with regard to conveyor belts, coated fabrics and other elements for the interior furnishing of vehicles, pipes and hoses, window frames or polymer-insulated power cables.

Thorough grinding of these articles usually results in a mixture of fine particles of heterogeneous composition, which is difficult to purify and reuse. Furthermore, in the case of fiber-reinforced articles (for example, polyester or nylon-fiber-reinforced articles), the fibers often form a kind of wadding which makes it much more complicated to reuse the ground particles.

Various processes based on dissolving, using organic solvents, have already been proposed; however, they often cause safety and pollution problems.

Patents EP 945481, EP 1232204 and EP 1268628 to SOLVAY aim at solving that problem by providing a recycling process which is simple, economic and reliable, which does not produce much pollution and which allows plastics of high purity and advantageous morphology to be recovered, while substantially preventing any additives from being extracted therefrom. This process includes the dissolution of the polymer in an adequate solvent capable of dissolving it and susceptible of forming an azeotrope with water, and its precipitation by injecting steam in the solution thus obtained, which moreover leads to the stripping of the water-solvent azeotrope and so leaves behind a mixture essentially consisting of water and of solid polymer particles which are recovered, while the vapors resulting from the stripping are condensed and decanted so as to recover both a solvent phase for a subsequent dissolution and a "water" phase for a subsequent precipitation.

These patents specify that if the article is reinforced with fibers, said fibers may be recovered as well and in order to increase their purity, they may be subjected to a subsequent centrifuging and/or washing step, for example using the same solvent, for the purpose of removing any residual traces of polymer. According to their teaching, the solvent which would have been used for the washing may advantageously be mixed with the fresh solvent used for the dissolving step; the fact that it contains traces of dissolved polymer does not in any way lessen the effectiveness of the dissolving operation. The fibers may be reused directly for the manufacture of plastic-based reinforced articles.

JP 2008-062186 describes in its examples, a washing treatment according to which the recovered fibers are first washed by "filtration washing" (i.e. the fibers are recovered from the polymer solution on a filter through which solvent is passed, eventually several times) and then, they are either (1) merely dried with hot air, or (2) they are first dispersed again in solvent to form a slurry in which steam is injected to remove the solvent, after which the fibers are recovered by filtration and dried using hot air. However, such a process offers the disadvantage that either the residual content of solvent on the fibers is too high (alternative (1)) or the process is economically unattractive because much solvent has to be evaporated (alternative (2)) or because of the use of hot air (alternatives (1) and (2)). Additionally, in both alternatives, the residual polymer of vinyl chloride is removed by rinsing with solvent through the fibers retained on a filter, which is not very efficient.

SUMMARY OF THE INVENTION

The present invention aims at solving these problems by providing a process for recycling a fiber reinforced polymer article, according to which:

said article, eventually cut in fragments, is dissolved in a solvent capable of dissolving the polymer but not the fibers and which is susceptible of forming an azeotrope with water, forming a solution;
the fibers are recovered from said solution;
said fibers are washed with solvent by putting them in the form of a slurry in said solvent and by agitating the slurry and/or by making the solvent circulate through it;
the washed fibers are recovered from said slurry; and
said recovered fibers are submitted to a stripping with steam in order to substantially remove the solvent.

DETAILED DESCRIPTION OF THE PREFERRED EMBODIMENTS

The articles reinforced with fibers in question may be of any kind of polymer, although they preferably consist of one or more vinyl chloride (VC) polymers (PVC) reinforced with fibers. VC polymer (PVC) should be understood to mean any homopolymer or copolymer containing at least 50% by weight of VC. Homopolymers of vinyl chloride are generally used. Apart from one or more polymers and fibers, the articles may also contain one or more of the usual additives such as, for example, plasticizers, stabilizers, antioxidants, fire retardants, pigments, fillers, etc.

The articles may be in any form, for example in the form of flexible pipes or hoses or rigid pipes, containers, sheets for covering soils (carpet tiles for instance), tarpaulins, window frames, insulating sheaths of power cables, wall papers, etc. They may have been manufactured by any known technique: extrusion, coating, injection moulding, etc.

The term "sheet" should be understood to mean any thin, flexible or rigid, single-layer or multilayer article, which may or may not be reinforced by reinforcing fibers embedded in the plastic. These sheets have any thickness, however this is generally less than 10 mm; their thickness is usually between 0.1 and 5 mm. The process is particularly advantageous for recycling carpet tiles or tarpaulins, i.e. fiber-reinforced sheets, intended especially for covering soils, for covering vehicles, for concealing buildings on which work is being carried out, for the construction of sets for entertainments or exhibitions, or for advertizing purposes. The sheets may have been manufactured by any technique, for example by calendering or by coating; the reinforced sheets are often manufactured by coating a network of fibers by means of a plastisol and heating.

The reinforcing fibers may be of any kind—natural or synthetic; glass fibers, cellulose fibers or plastic fibers may especially be used. Often these are plastic fibers, particularly polyester (like polyethylene terephthalate (PET)) or polyamide (nylon) fibers. The diameter of the fibers is usually of the order of 10 to 100 μm. They are often long fibers, the length of which may be up to several metres. However, they may also be shorter fibers—ranging from a few millimetres to a few centimetres in length—possibly forming a woven fabric, a nonwoven fabric or a felt. By way of illustration, the fibers may represent from 1 to 50% of the weight of a reinforced sheet, generally from 10 to 40%.

While the process according to the present invention allows to recycle fiber reinforced polymer articles, this process can also be used for recycling polymer (preferably PVC)/metal composites containing preferably from 5 to 99% by weight of metal. Any metal may be present in such composites. Preferably metals such as copper, aluminium, iron alloys or steels are present in the composites. The composites may be in any form, for example in the form of plates, cables, rods or threads. They may have been manufactured by any known technique. All the characteristics and preferences detailed hereafter for the process according to the invention apply for the process for recycling such composites except that preference is particularly given to the use of a rotating tumbler.

The first step of the process according to the invention consists, if necessary, in cutting the articles so as to reduce them to fragments which are easy to handle. It is clear that if the article is already in the form of fragments of suitable dimensions, the cutting step is superfluous.

The fragments of articles thus obtained are then subjected to the action of a solvent having several specific characteristics. This operation may be carried out in any suitable apparatus, especially one which takes into account the safety and environmental requirements, for example in a closed reactor exhibiting sufficient chemical resistance. The apparatus is preferably a cylindrical closed reactor which can be placed horizontally or vertically. Among such apparatus which can be used, one can cite the dissolver-filter which is a cylindrical closed reactor placed vertically in which a screen is incorporated as a bottom filtration plate, the rotating tumbler which is a cylindrical closed reactor placed horizontally containing a cylindrical perforated basket and other cylindrical closed reactors placed vertically containing a cylindrical perforated basket.

The reaction mixture is preferably stirred (this is particularly the case with the dissolver-filter which is preferably equipped with an axial pumping impeller), placed in rotation in only one direction or in each direction alternatively (this is particularly the case with the rotating tumbler containing a cylindrical perforated basket, the rotation of which is forced by an engine) and/or a pump is used to circulate the solvent inside the apparatus (this is particularly the case with the other cylindrical closed reactors placed vertically containing a cylindrical perforated basket).

The solvent used is a substance—or a mixture of substances—capable of dissolving the polymer, preferably vinyl chloride polymer, contained in the treated article. However the solvent must not dissolve the reinforcing fibers. It is also necessary, in the context of the process according to the invention, for the solvent used to be advantageously at least partially miscible with water, and to form an azeotrope with water.

Particularly if the polymer is PVC, the solvent is advantageously chosen from methyl ethyl ketone (MEK), methyl isobutyl ketone (MIBK), n-methylpyrrolidone (NMP) and tetrahydrofuran (THF). Especially if the polymer is PVC, it is preferred to use MEK (preferably both for dissolving the article and for the washing of the fibers) which forms, with water, an azeotrope containing (at atmospheric pressure) 11% water and 89% MEK (by weight). This solvent does not dissolve glass, polyester or nylon fibers and gives quite good results.

In fact, in the context of an industrial process which is either a batch process functioning in loop, or a continuous process, where the reactives (water and solvent) are recycled and where additives are used (like a phase separation agent (PSA) and an alcohol as described in patent application FR 2921372 in the name of SOLVAY), the solvent is generally not pure but does comprise a few percents (in weight) of these additives (for instance up to 10%, even 31%). The term "solvent" is therefore to be understood to mean both single substances and mixtures of substances.

Examples of PSA are aliphatic hydrocarbon having 5 to 7 carbon atoms. In particular with MEK as solvent, excellent results have been obtained by choosing n-hexane or isohexane (2-methylpentane) as a phase separation agent. Examples of alcohols are linear aliphatic alcohols apart from methanol. In particular, C2-C6 linear aliphatic alcohols are especially suitable, and most particularly C3-05 linear aliphatic alcohols.

Isopropanol and tent-butyl alcohol (2-methyl-2-propanol) are therefore particularly suitable. The solvent may also contain a certain amount of water.

When the polymer is PVC, good results have been obtained when the solvent used both for dissolving the article and for washing of the fibers contains between 2% and 8% by weight of alcohol (preferably isopropanol), between 13% and 17% of a PSA (preferably isohexane) and between 4% and 6% of water, the remainder (namely between 69% and 81% by weight) being composed of MEK.

The dissolving operation is carried out at any temperature, but the solvent is advantageously liquid at this temperature, of course. It is preferred to operate under auto-generated pressure and at a temperature of advantageously between 20 and 120° C., preferably from 50 to 100° C.

The dissolving operation may be carried out at any pressure. However, it is preferred to carry out the operation at a pressure of from 2 to 10 barg (relative pressure, that is the gauge pressure measured on the pressure gauge), preferably from 2 to 4 bar.

The time during which the dissolving operation is carried is advantageously of at least 5, preferably of at least 10 minutes. This time is advantageously of at most 120, preferably of at most 40 minutes.

According to a preferred embodiment of the present invention, prior to being dissolved, the (fragments of the) article are put either directly into the dissolver-filter above the screen incorporated as a bottom filtration plate, or into the cylindrical perforated basket contained in the rotating tumbler or in the other cylindrical closed reactors. The holes of the screen or of the cylindrical perforated basket are preferably chosen of a size such that they keep most the fibers inside the recipient, while still allowing the solvent to circulate so that efficient dissolution can occur.

The introduction of the (fragments of the) article into the apparatus is preferably followed by oxygen removal and replacement by an inert gas like nitrogen, for safety reasons.

Available after the dissolving step is advantageously a solution comprising, on the one hand, a liquid phase consisting of the solvent in which the polymer is dissolved and, on the other hand, any undissolved constituents including the reinforcing fibers. According to the invention, these are recovered from said solution by being separated from the liquid phase, preferably by filtration, more preferably through the screen of the dissolver-filter whose apertures have dimensions of the order of 0.1 to 10 mm, or through the cylindrical perforated basked contained in the rotating tumbler or in the other cylindrical closed reactors whose apertures have dimensions of the order of 0.1 to 10 cm.

In a first preferred embodiment of the present invention, the dissolution takes place in a dissolver-filter in which a screen is incorporated into the dissolver as a bottom filtration plate so that at the end of the dissolution step, the polymer solution is discharged through said plate to be treated separately, while the fibers and all eventual other insolubles remain inside the dissolver to be further treated therein as claimed i.e. by washing them first, recovering them substantially dry again and then, stripping them with steam. Hence, in that embodiment, the dissolver is called a dissolver-filter because dissolution, separation, washing and steam stripping steps all occur therein.

In a second preferred embodiment of the present invention, the dissolution takes place in a rotating tumbler containing a cylindrical perforated basket so that at the end of the dissolution step, the polymer solution is discharged through said perforated basket to be treated separately, while the fibers and all eventual other insolubles remain inside the basket to be further treated inside said basket and tumbler as claimed i.e. by washing them first, recovering them substantially dry again and then, stripping them with steam. Hence, in that embodiment, dissolution, separation, washing and steam stripping steps all occur inside the basket and tumbler.

If the stripping step is performed on the fibers as they are after their separation from the polymer solution, the residual content of polymer (preferably PVC) on the fibers is such that they will stick together. Hence, the residual polymer content must be very low and/or said polymer must be precipitated on the fibers before stripping them.

Hence, according to the invention, the fibers are washed with solvent by putting them in the form of a slurry in said solvent (preferably hot, more preferably the same as the one used for the dissolution of the article), advantageously at least once, before steam stripping them. Preferably, they are washed at least twice and even more preferably, at least 3 times before steam stripping them. The solvent resulting from each washing step is preferably stored in a buffer tank so that it can be re-used in a subsequent batch, for instance for washing and/or dissolving. During washing, the slurry is preferably agitated and/or the solvent circulates through it.

Alternatively or additionally, after having been washed (eventually several times) with solvent, the fibers may be washed with (preferably hot) water by putting them in the form of a slurry in water, before being steam stripped (so as to precipitate the polymer onto the fibers). During washing, the slurry is preferably agitated and/or water circulates through it.

Preferably, the recovering of the fibers after the/each washing step occurs as after the dissolution i.e. the fibers are retained on the bottom filtration plate of the dissolver-filter or inside the cylindrical perforated basket of the rotating tumbler and the steam stripping step occurs while the fibers are still retained on/in these items, by blowing steam therein. In the particular case of the dissolver-filter, steam can be either introduced by the bottom or by the top, preferably by the top. In the particular case of the rotating tumbler, the way steam is introduced is not critical. The evaporated solvent is advantageously sent to a condensation sector and recovered.

After the stripping, either the fibers are advantageously placed in suspension under stirring by addition of cold water and discharged from the dissolver-filter to the atmosphere by by-passing the bottom filtration plate or the tumbler is advantageously opened then the basket extracted from the tumbler by a mechanical device and opened, so that the fibers retained therein are discharged to the atmosphere.

On the other hand, the polymer solution is advantageously sent to the precipitator. In this vessel, the solvent is advantageously evaporated under vacuum and agitation by direct steam injection. At a certain moment, the organic phase is no longer a solvent for the polymer so that said polymer will advantageously precipitate in small particles with the fillers and the plasticizer. The particle size and the bulk density of the polymer particles are advantageously controlled by the injection of water and surfactant agent during this process. The organic phase is advantageously replaced by the aqueous phase and a solvent-free slurry of recycled polymer particles into water is obtained at the end of the process. This slurry is advantageously discharged to a slurry tank and continuously centrifuged. The water is advantageously sent to the waste water treatment and the recycled polymer is advantageously dried in a fluidized bed, sieved and packaged in big-bags.

The evaporated solvent is advantageously sent to the condensation sector, decanted from aqueous phase and stored, ready for use. The non condensed gas, containing nitrogen and solvent is advantageously burned.

The invention will further be described in more in detail based on one best mode of carrying out the first preferred embodiment of the present invention and which concerns the treatment of tarpaulins made of plasticized PVC containing among others DOP (dioctyl phthalate) as plasticizer, polyester as well as $CaCO_3$ as inert filler.

The tarpaulins are first cut into fragments, the dimensions of which are of maximum 10 to 15 cm and then fed into a cylindrical dissolver-filter, placed vertically, equipped with an axial pumping impeller and with a screen incorporated as a bottom filtration plate. This dissolver-filter is closed and the oxygen is removed and replaced by nitrogen. This step is necessary for safety reasons because the vapor of solvent mixed with oxygen is explosive.

Hot solvent (coming from a buffer tank containing the solvent of the first washing of the last batch) is introduced into the dissolver-filter. The dissolution occurs typically at 95° C., 3 barg and takes 10 minutes under agitation.

Typically the solvent contains 75% MEK, 15% isohexane, 5% water and 5% isopropanol.

This solvent will selectively dissolve the PVC resin and the plasticizer. The filler ($CaCO_3$) is not dissolved but is in suspension in the solution. The polyester and the nylon fibers are not dissolved.

After complete dissolution of the PVC, the solution is discharged from the dissolver-filter to a precipitator through the bottom filtration plate. This filtration plate is perforated with holes small enough to keep the fibers and big enough to avoid plugging and have a high filtration rate.

Once the filtration is completed, the fibers are still wet and contain a certain amount of solution containing PVC resin.

Depending on the maximum allowed concentration of PVC resin in the fibers, some washing steps may be required. This (these) washing step(s) is performed by putting the fibers in suspension into the dissolver-filter with hot solvent. The hot solvent is coming from buffer tank(s) containing the washing solvent of the previous batch. Generally, it is only after three washing steps that the PVC content into the fibers is low enough to minimize the risk of sticking the fibers during the steam stripping step. Preferably, only the last washing step is performed with clean hot solvent. For every step, the washing solvent is stored in a separate buffer and used for the next batch.

The washed fibers are wet and still contain solvent. This solvent has to be removed in order to discharge the fibers safely to the atmosphere. The removal of the solvent is done in the dissolver-filter by injecting steam therein through the top of the dissolver. The evaporated solvent is sent to a condensation sector and recovered. After the stripping, the fibers are placed in suspension under stirring by addition of cold water and discharged from the dissolver-filter to the atmosphere near the fibers treatment facilities.

The dissolver filter is then ready for the next batch.

On the other hand, the PVC solution is sent to the precipitator. In this vessel, the solvent is evaporated under vacuum and agitation by direct steam injection. At a certain moment, the organic phase is no longer a solvent for the PVC so that said PVC will precipitate in small particles with the fillers and the plasticizer. The particle size and the bulk density of the PVC particles are controlled by the injection of water and surfactant agent during this process. The organic phase is replaced by the aqueous phase and a solvent-free slurry of recycled PVC particles into water is obtained at the end of the process. This slurry is discharged to a slurry tank and continuously centrifuged. The water is sent to the waste water treatment and the recycled PVC is dried in a fluidized bed, sieved and packaged in big-bags.

The evaporated solvent is sent to the condensation sector, decanted from aqueous phase and stored, ready for use. The non condensed gas, containing nitrogen and solvent is burned.

The invention will further be described in more in detail based on one best mode of carrying out the second preferred embodiment of the present invention and which concerns the treatment of carpet tiles made of plasticized PVC containing among others DOP (dioctyl phthalate) as plasticizer, polyester and/or nylon fibers, as well as $CaCO_3$ as inert filler.

These tiles, the dimensions of which are 50 cm×50 cm square, are fed, without being cut beforehand, into a cylindrical perforated basket which is introduced with a mechanical device into a tumbler, the rotation of which can be forced by an engine. This tumbler is closed and the oxygen is removed and replaced by nitrogen. This step is necessary for safety reasons because the vapor of solvent mixed with oxygen is explosive.

Hot solvent (coming from a buffer tank containing the solvent of the first washing of the last batch) is introduced into the tumbler. The dissolution occurs typically at 95° C., 3 barg and takes 10 minutes under rotation of the tumbler and the basket.

Typically the solvent contains 75% MEK, 15% isohexane, 5% water and 5% isopropanol.

This solvent will selectively dissolve the PVC resin and the plasticizer. The filler ($CaCO_3$) is not dissolved but is in suspension in the solution. The polyester and the nylon fibers are not dissolved.

After complete dissolution of the PVC, the solution is discharged from the tumbler to a precipitator through the cylindrical perforated basket. This basket is perforated with holes small enough to keep the fibers and big enough to avoid plugging and have a high filtration rate.

Once the filtration is completed, the fibers are still wet and contain a certain amount of solution containing PVC resin.

Depending on the maximum allowed concentration of PVC resin in the fibers, some washing steps may be required. This (these) washing step(s) is performed by putting the fibers in suspension into the tumbler with hot solvent. The hot solvent is coming from buffer tank(s) containing the washing solvent of the previous batch. Generally, it is only after three washing steps that the PVC content into the fibers is low enough to minimize the risk of sticking the fibers during the steam stripping step. Preferably, only the last washing step is performed with clean hot solvent. For every step, the washing solvent is stored in a separate buffer and used for the next batch.

The washed fibers are wet and still contain solvent. This solvent has to be removed in order to discharge the fibers safely to the atmosphere. The removal of the solvent is done in the tumbler by injecting steam therein. The evaporated solvent is sent to a condensation sector and recovered. After the stripping, the tumbler is opened, then the basket is extracted from the tumbler by a mechanical device and opened, so that the fibers retained therein are discharged to the atmosphere near the fibers treatment facilities. The tumbler is then ready for the next batch (another basket full of carpet tiles should be ready at this moment).

On the other hand, the PVC solution is sent to the precipitator. In this vessel, the solvent is evaporated under vacuum and agitation by direct steam injection. At a certain moment, the organic phase is no longer a solvent for the PVC so that said PVC will precipitate in small particles with the fillers and the plasticizer. The particle size and the bulk density of the PVC particles are controlled by the injection of water and surfactant agent during this process. The organic phase is replaced by the aqueous phase and a solvent-free slurry of recycled PVC particles into water is obtained at the end of the process. This slurry is discharged to a slurry tank and continuously centrifuged. The water is sent to the waste water treatment and the recycled PVC is dried in a fluidized bed, sieved and packaged in big-bags.

The evaporated solvent is sent to the condensation sector, decanted from aqueous phase and stored, ready for use. The non condensed gas, containing nitrogen and solvent is burned.

The invention claimed is:

1. A process for recycling a fiber reinforced polymer article, comprising:
   the article, optionally cut in fragments, is dissolved in a solvent capable of dissolving the polymer but not the fibers and wherein the solvent forms an azeotrope with water, forming a solution;
   the fibers are recovered from the solution;
   the fibers are washed with a solvent by putting the fibers in the form of a slurry in the washing solvent and by agitating the slurry, by making the washing solvent circulate through the slurry or both agitating the slurry and making solvent circulate through the slurry, wherein the washing by slurry substantially removes the polymer from the fibers and prevents the fibers from sticking together;

the washed fibers are recovered from the slurry; and the recovered fibers are submitted to a stripping with steam in order to substantially remove the washing solvent.

2. The process according to claim 1, wherein the solvent used for dissolving the article and the solvent used for the washing of the fibers are the same.

3. The process according to claim 1, wherein the polymer is a vinyl chloride polymer, and wherein the solvent used both for dissolving the article and for the washing of the fibers comprises between 2% and 8% by weight of alcohol, between 13% and 17% of a phase separation agent, and between 4% and 6% of water, the remainder being methyl ethyl ketone.

4. The process according to claim 1, wherein the dissolution takes place in a dissolver-filter in which a screen is incorporated into the dissolver as a bottom filtration plate, so that at the end of the dissolution step, the polymer solution is discharged through the plate to be treated separately while the fibers and all other insolubles remain inside the dissolver to be further treated therein.

5. The process according to claim 1, wherein the dissolution takes place in a rotating tumbler containing a cylindrical perforated basket, so that at the end of the dissolution step, the polymer solution is discharged through the perforated basket to be treated separately while the fibers and all other insolubles remain inside the basket to be further treated inside the basket and tumbler.

6. The process according to claim 1, wherein the fibers are washed at least twice before steam stripping them.

7. The process according to claim 6, wherein the solvent resulting from each washing step is stored in a buffer tank and re-used in a subsequent batch for washing, dissolving or washing and dissolving.

8. The process according to claim 1, wherein after having been washed with solvent and before being steam stripped, the fibers are washed with water so as to precipitate residual polymer onto the fibers.

9. The process according to claim 4, wherein after the washing step, the fibers are retained on the bottom filtration plate of the dissolver-filter, and wherein the steam stripping step occurs while the fibers are still retained on the bottom filtration plate, by blowing steam therein.

10. The process according to claim 5, wherein after the washing step, the fibers are retained inside the cylindrical perforated basket of the rotating tumbler, and wherein the steam stripping step occurs while the fibers are still retained inside the cylindrical perforated basket, by blowing steam therein.

11. A process for recycling a fiber reinforced polymer article, the article comprising:
a polymer; and
reinforcement fibers;
the process comprising:
optionally, cutting the article in fragments;
in a reactor capable of retaining a solid material from a liquid slurry, dissolving the polymer in a solvent not capable of dissolving the fibers to obtain a slurry of the fibers in a solvent solution of the polymer;
removing the solvent solution of the polymer from the fibers and from the reactor to obtain the fibers wet with the solvent solution retained in the reactor;
washing the wet fibers retained in the reactor with a wash solvent not capable of dissolving the fibers to remove the solvent solution of the polymer from the fibers and from the reactor and to obtain washed fibers comprising residual wash solvent retained in the reactor;
stripping the washed fibers retained in the reactor of the residual wash solvent with steam to obtain recovered fibers substantially free of the wash solvent; and
discharging the recovered fibers from the reactor;
wherein
the dissolution solvent and the wash solvent each form an azeotrope with water, and washing the wet fibers comprises:
slurrying the wet fibers in the washing solvent agitating the slurry; or circulating the washing solvent through the slurry; or both agitating the slurry and circulating the wash solvent through the slurry;
removing the wash solvent from the slurry to obtain the washed fibers.

12. The process according to claim 11, wherein the polymer dissolution solvent and the wash solvent comprise the same chemical composition.

13. The process according to claim 11, wherein
the polymer is a vinyl chloride polymer, and
the dissolution solvent and the wash solvent comprise:
2% to 8% by weight of alcohol,
13% to 17% of a phase separation agent,
4% to 6% of water, and
methyl ethyl ketone.

14. The process according to claim 11, wherein
the reactor is a dissolver-filter which comprises:
a screen incorporated into the dissolver as a bottom filtration plate, and
the process further comprises at the end of the dissolution:
discharging the polymer solution through the bottom filtration plate while retaining the fibers and other materials insoluble in the solvent inside the dissolver.

15. The process according to claim 11, wherein the reactor is a rotating tumbler which comprises:
a cylindrical perforated basket, and
the process further comprises at the end of the dissolution:
discharging the polymer solution through the perforated basket while retaining the fibers and other materials insoluble in the solvent inside the basket.

* * * * *

UNITED STATES PATENT AND TRADEMARK OFFICE
CERTIFICATE OF CORRECTION

PATENT NO. : 8,420,702 B2
APPLICATION NO. : 12/990929
DATED : April 16, 2013
INVENTOR(S) : Jacques Van Weynbergh et al.

It is certified that error appears in the above-identified patent and that said Letters Patent is hereby corrected as shown below:

In the Claims

Column 10 Line 23 "slurrying the wet fibers in the washing solvent agitating" should read
--slurrying the wet fibers in the washing solvent; agitating--

Signed and Sealed this
Twenty-fifth Day of June, 2013

Teresa Stanek Rea
*Acting Director of the United States Patent and Trademark Office*